US006764423B2

(12) United States Patent
Lemanski

(10) Patent No.: US 6,764,423 B2
(45) Date of Patent: Jul. 20, 2004

(54) VARIABLE SPEED POWER TRANSMISSION SYSTEM

(76) Inventor: Alphonse J. Lemanski, #1 Kimberly Dr., Huntington, CT (US) 06484

( * ) Notice: Subject to any disclaimer, the term of this patent is extended or adjusted under 35 U.S.C. 154(b) by 0 days.

(21) Appl. No.: 10/079,801

(22) Filed: Feb. 19, 2002

(65) Prior Publication Data

US 2002/0151401 A1 Oct. 17, 2002

Related U.S. Application Data

(63) Continuation-in-part of application No. 09/736,869, filed on Dec. 14, 2000, now Pat. No. 6,348,021.
(60) Provisional application No. 60/170,785, filed on Dec. 15, 1999.

(51) Int. Cl.[7] ............................. F16H 23/00; F16H 3/70
(52) U.S. Cl. ........................................ 475/164; 475/169
(58) Field of Search ................................. 475/163, 164, 475/169, 171, 5, 149

(56) References Cited

U.S. PATENT DOCUMENTS

| | | | | |
|---|---|---|---|---|
| 655,697 A | | 8/1900 | Dunn ......................... 475/164 |
| 1,495,784 A | * | 5/1924 | Fereday ...................... 475/163 |
| 1,748,907 A | | 2/1930 | Vallance ..................... 475/163 |
| 1,881,931 A | | 10/1932 | Powell ........................ 475/169 |
| 2,144,110 A | | 1/1939 | Herrick ....................... 475/169 |
| 2,699,690 A | | 1/1955 | Kobler ........................ 475/164 |
| 2,785,590 A | | 3/1957 | Sundt .......................... 475/169 |
| 2,871,382 A | * | 1/1959 | Bouvier ....................... 475/163 |
| 2,953,944 A | | 9/1960 | Sundt .......................... 475/169 |
| 3,139,771 A | | 7/1964 | Maroth ........................ 475/164 |
| 3,590,659 A | | 7/1971 | Maroth ........................ 475/164 |
| 3,595,103 A | * | 7/1971 | Wildhaber .................... 74/640 |
| 3,640,154 A | * | 2/1972 | Massie ........................ 475/164 |
| 3,722,322 A | | 3/1973 | Coeppert ...................... 475/171 |
| 3,895,540 A | * | 7/1975 | Davidson ..................... 475/164 |
| 3,935,750 A | | 2/1976 | Maroth ......................... 74/61 |
| 4,262,556 A | * | 4/1981 | Hart ............................ 475/164 |
| 4,281,566 A | * | 8/1981 | Brusasco ..................... 475/164 |
| 4,620,457 A | | 11/1986 | Distin et al. ................. 475/164 |
| 4,702,126 A | * | 10/1987 | Nakamura ................... 475/164 |
| 4,946,428 A | * | 8/1990 | Barozzi ....................... 475/164 |
| 4,966,573 A | | 10/1990 | Yokoi .......................... 477/164 |
| 4,997,413 A | * | 3/1991 | Dahlquist ................... 475/163 |
| 5,799,749 A | * | 9/1998 | Yamamoto et al. .......... 180/247 |
| 6,286,391 B1 | * | 9/2001 | Gassmann .................... 74/650 |

FOREIGN PATENT DOCUMENTS

GB 2117474 10/1983

* cited by examiner

*Primary Examiner*—Tisha D Lewis
(74) *Attorney, Agent, or Firm*—Monahan & Costello, LLC

(57) ABSTRACT

Continuously variable speed power transmission with integrated motor/generator components. The transmission has an input member rotatable about an input axis, an output member rotatable about an output axis, a reaction control rotor with integrated motor/generator components for selective rotation about the input axis, a pericyclic motion converter mounted for nutational motion about the input axis, and a control means for selectively adjusting the rate of rotation of the reaction control rotor relative to the input member. The continuously variable speed power transmission with integrated motor/generator components can be located in a vehicle wheel hub.

12 Claims, 15 Drawing Sheets

VARIABLE SPEED POWER TRANSMISSION SYSTEM

REFERENCE TO RELATED APPLICATIONS

The present application is a continuation-in-part of application U.S. Ser. No. 09/736,869, filed Dec. 14, 2000, now U.S. Pat. No. 6,348,021 issued Feb. 19, 2002, which in time claims priority under 35 USC 119(e) from U.S. Provisional Application No. 60/170,785, filed Dec. 15, 1999.

BACKGROUND OF THE INVENTION

1. Field of the Invention

The present invention relates to power transmission systems and, more particularly, to such systems which are of the all rolling, positive contacting, variable speed type and, still more particularly, wherein extensive load sharing occurs among the load transmitting members.

2. Prior Art

The present invention relates to a transmission system which incorporates oscillator members. It is known in the art to use a wobbling member known as a nutator to effect a fixed gear reduction or speed reduction/increase in a transmission system. Generally representative of the pertinent prior art as it pertains to the present invention U.S. Pat. No. 4,620,457 to Distin et al., U.S. Pat. No. 3,590,659 to Maroth, U.S. Pat. No. 3,935,750 to Maroth, and U.S. Pat. No. 1,748,907 to Valiance.

U.S. Pat. No. 4,620,457 to Distin et al. discloses a torque transmitting gearing system of the nutating type equipped with a nutating idler member which is in torque transmitting engagement with both a stator and an output gear. Torque transmission between the respective elements is achieved via respective series of rolling, torque transmitting elements in the form of tapered rollers. The rollers are maintained in substantially continuous contact with both their respective driving and driven raceway surfaces, which are formed with trochoidal curvature. Within a given pair of coacting gear surfaces, one surface is shaped with epitrochoidal curvature, and the other with hypotrochoidal curvature.

U.S. Pat. No. 3,590,659 to Maroth discloses a speed changer apparatus with a nutating member having force transfer members in the form of roller elements which nutatively contact inclined surfaces on an action member coupled to an output shaft. The nutating member is prevented from rotation by stationary mounted inclined surfaces which are contacted by force transfer members/The nutating member is peripherally engaged by a rotating driving member coupled to a rotating input shaft. The driving member is provided with a surface shaped to impart nutative motion to the nutating member. Superior axial balance is obtained by operating a pair of nutating sections with opposing axial motions with respect to each other.

U.S. Pat. No. 1,748,907 to Vallance discloses apparatus for transmitting rotary motion from one rotatable element to another rotatable element using a plate, ring, or similar component connected to the rotatable elements using such a construction that rotation of one of the elements causes the plate, ring, or similar component to tilt or oscillate in such a manner that every point in its circumference moves in a lemniscate path and effects rotation of the other one of the elements at an invariable reduced speed or at an invariable increased speed. In greater detail, the Valiance patent discloses a speed reduction mechanism in the form of a nutating gear system, wherein an input shaft initiates wobbling motion of an intermediate member 7, via the engagement of a portion 9b of the intermediate member with an angled or canted portion of the input shaft 2. Radially outwardly on the member 7 are disposed a train of teeth 10 which engage stator teeth 11 formed on a portion of the stationary housing 5. Inside of the cup-member 7 are arranged a number of hemispherical recesses 7b, in which are fixedly seated a like number of balls 8. These balls are in turn in engagement with a continuous curved groove 6b formed in an output member 6. As with other known nutating systems, the engagement between stator teeth 10, 11 prevents the intermediate member 7 from rotating during nutation, so that output rotation is effected solely by means of the engagement between the fixed balls and the groove. As the idler member 7 nutates, the balls 8 successively cam the element 6 rotationally by engaging the walls of the curved groove.

It was with knowledge of the foregoing state of the technology that the present invention has been conceived and is now reduced to practice.

SUMMARY OF THE INVENTION

The present invention discloses, in one embodiment, a continuously variable speed power transmission includes a rotatable input member, a rotatable output member including a plurality of rearwardly directed output face cams thereon. A reaction control rotor mounted for selective rotation about the input axis includes a plurality of forwardly directed reaction face cams thereon in opposition to the output face cams on the output member. A pericyclic motion converter rotatably mounted for nutational motion about the input axis includes a plurality of load transmitting follower members thereon simultaneously engageable with the output face cams and with the reaction face cams. A control mechanism selectively adjusts the rate of rotation of the reaction control rotor relative to the input member such that relative rotation between the reaction control rotor and the input member results in both rotation and nutation of the pericyclic motion converter about the input axis and thereby results in a continuously variable change of ratio of the rotational speed of the output member relative to the input member. In another embodiment, the pericyclic motion converter is rotatably mounted on an encompassing housing. In either event, the load transmitting members of the pericyclic motion converter kinematically under pure rolling contact traverse a mathematically higher order spherical path of action during each revolution of the input member.

The present invention is an all rolling positive contacting mechanical variable speed, power transmission system. It utilizes the fundamental principles of high load capacity and torque transmission efficiency facilitated by high precision rolling element bearings. The concentrated rolling surface contact conditions that prevail in the present invention during torque transmission also facilitates its operation with minimal fluid lubricant. The unique design of conjugate load bearing surfaces in the present invention permits the use of tribologically robust materials and surface film transfer conditions to take place in the concentrated roller contacts. All other known mechanical power transmission systems that employ nutation and various types of gearing arrangements, balls and rollers which engage face cam tooth type surfaces do not possess the unique concentrated rolling conjugate surface contact conditions that are incorporated in the present invention. The present invention is thereby capable of much higher torque density and power transmission efficiency than other known continuously variable mechanical power transmission systems.

The transmission of the invention can be employed in many devices and includes an input member, reaction members driven by the input member, a pericyclic member or oscillator member driven by the input member and a drive output member driven by the pericyclic member, in which the rotation speed of the reaction member and or the pericyclic member can be controlled independent of the input member: thereby, allowing the speed reduction/increase at the output drive member to vary. More specifically, the invention is an all rolling positive contacting mechanical variable speed, power transmission system. It utilizes the fundamental principles of high load capacity and torque transmission efficiency of high precision rolling element bearings. The concentrated rolling surface contact conditions that prevail in the present invention during torque transmission facilitates its operation with minimal fluid lubricant. The unique design of conjugate load bearing surfaces in the present invention permits the use of tribologically robust materials and surface film transfer conditions to take place in the concentrated roller contacts. All other mechanical power transmission systems that employ various types of gearing arrangements, balls or rollers which engage face cam tooth type surfaces do not possess the unique concentrated rolling conjugate surface contact condition that is incorporated in the present invention. The present invention is thereby capable of higher torque density and power transmission efficiency than other mechanical power transmission systems.

A primary feature, then, of the present invention is the provision of a variable speed power transmission which not only produces a certain gear reduction or speed reduction/increase in a transmission using such an oscillator member but which operates to vary the gear reduction or speed reduction/increase in the transmission.

Another feature of the present invention is the provision of such a transmission which results in a continuously variable change of ratio of the rotational speed of the output member relative to the input member.

Yet another feature of the present invention is the provision of such a power transmission which includes an input member rotatable about an input axis, an output member rotatable about an output axis including a plurality of rearwardly directed output face cams thereon, a reaction control rotor mounted for selective rotation about the input axis including a plurality of forwardly directed reaction face cams thereon in opposition to the output face cams on the output member, a pericyclic motion converter rotatably mounted for nutational motion about the input axis including a plurality of load transmitting follower members thereon simultaneously engageable with the output face cams and with the reaction face cams, and an active control device for selectively adjusting the rate of rotation of the reaction control rotor relative to the input member whereby relative rotation between the reaction control rotor and the input member results in both rotation and nutation of the pericyclic motion converter about the input axis and thereby results in a continuously variable change of ratio of the rotational speed of the output member relative to the input member.

Still another feature of the present invention is the provision of such a power transmission in which the output face cams, the reaction face cams, and the follower members of the pericyclic motion converter all employ bevel type gear teeth including internal bevel type gear teeth having a pitch angle greater than 90°.

Yet a further feature of the present invention is the provision of such a transmission having the construction of the pericyclic motion converter being rotatably mounted on an encompassing housing.

Still another feature of the present invention is the provision of such a transmission in which the load transmitting members of the pericyclic motion converter kinematically under pure rolling contact traverse a mathematically higher order spherical path of action during each revolution of the input member.

Other and further features, advantages, and benefits of the invention will become apparent in the following description taken in conjunction with the following drawings. It is to be understood that the foregoing general description and the following detailed description are exemplary and explanatory but are not to be restrictive of the invention. The accompanying drawings which are incorporated in and constitute a part of this invention, illustrate one of the embodiments of the invention, and together with the description, serve to explain the principles of the invention in general terms. Like numerals refer to like parts throughout the disclosure.

BRIEF DESCRIPTION OF THE DRAWINGS

The foregoing aspects and other features of the present invention are explained in the following description, taken in connection with the accompanying drawings, wherein.

DETAILED DESCRIPTION OF THE PREFERRED EMBODIMENTS

Figure 1:
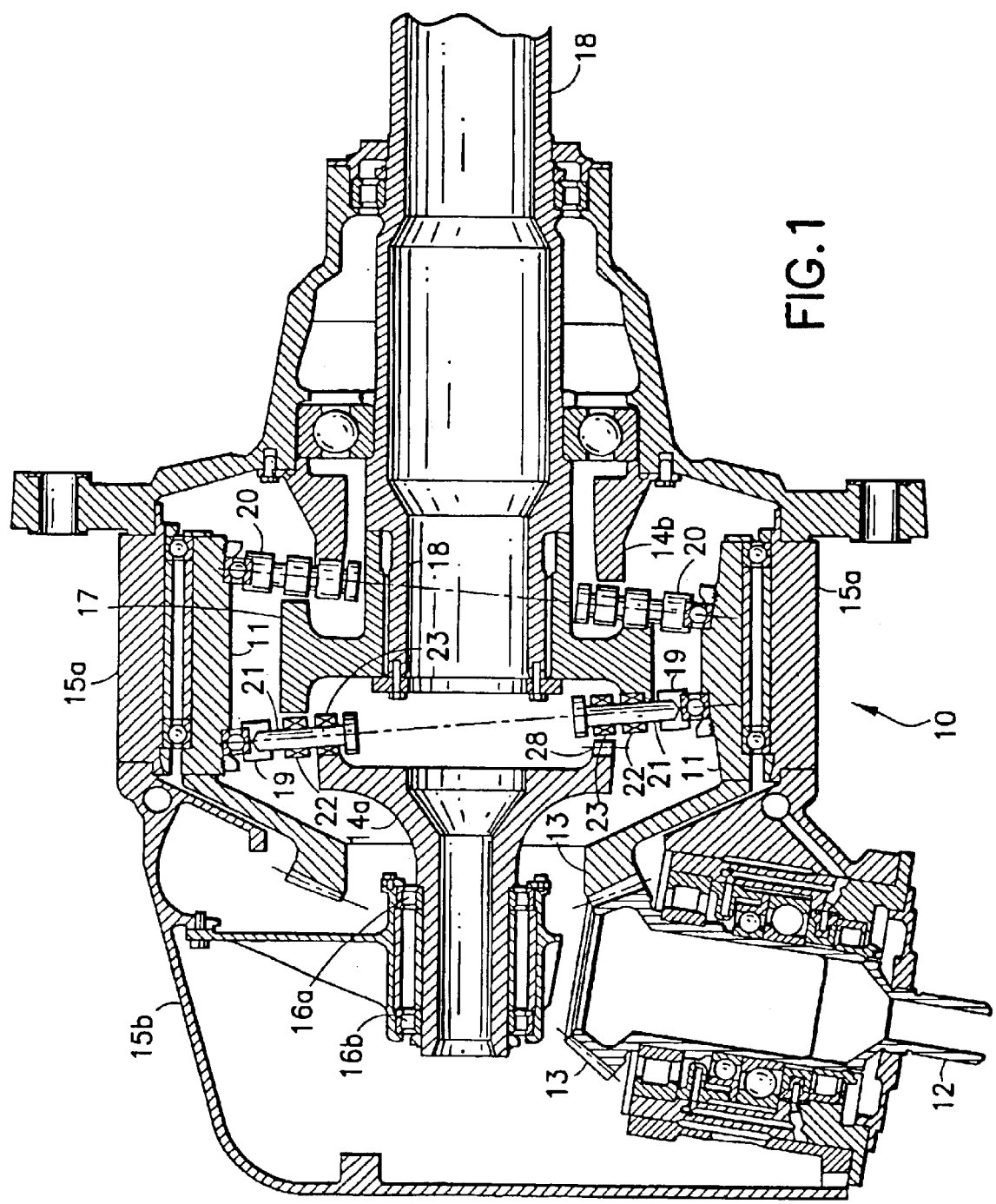
FIG. 1 is a side elevation view, in section, of one embodiment of the continuously variable power transmission of the present invention.
Figure 2:
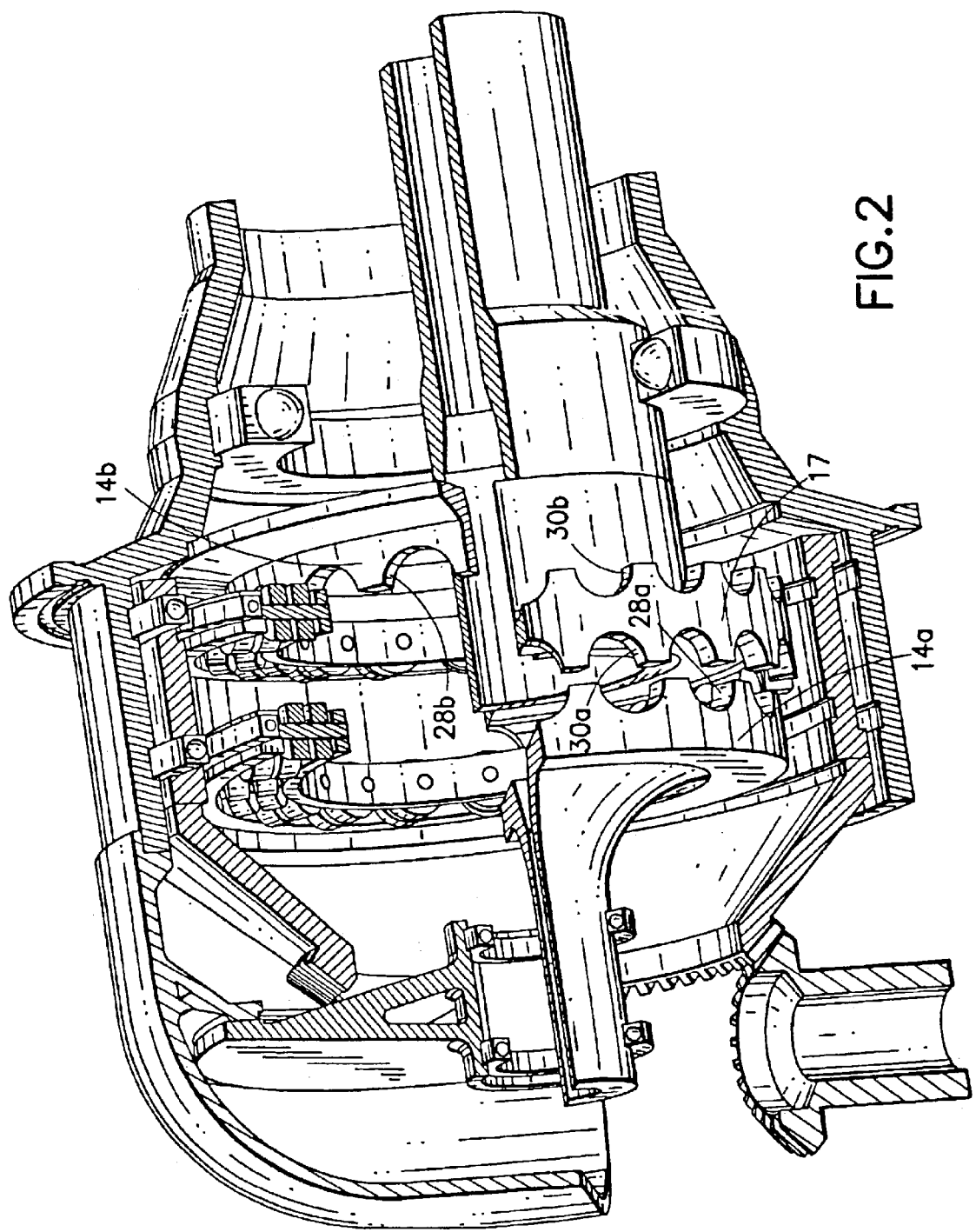
FIG. 2 is a perspective view, largely cut away and in section, illustrating the internal components of the power transmission illustrated in FIG. 1.
Figure 3:
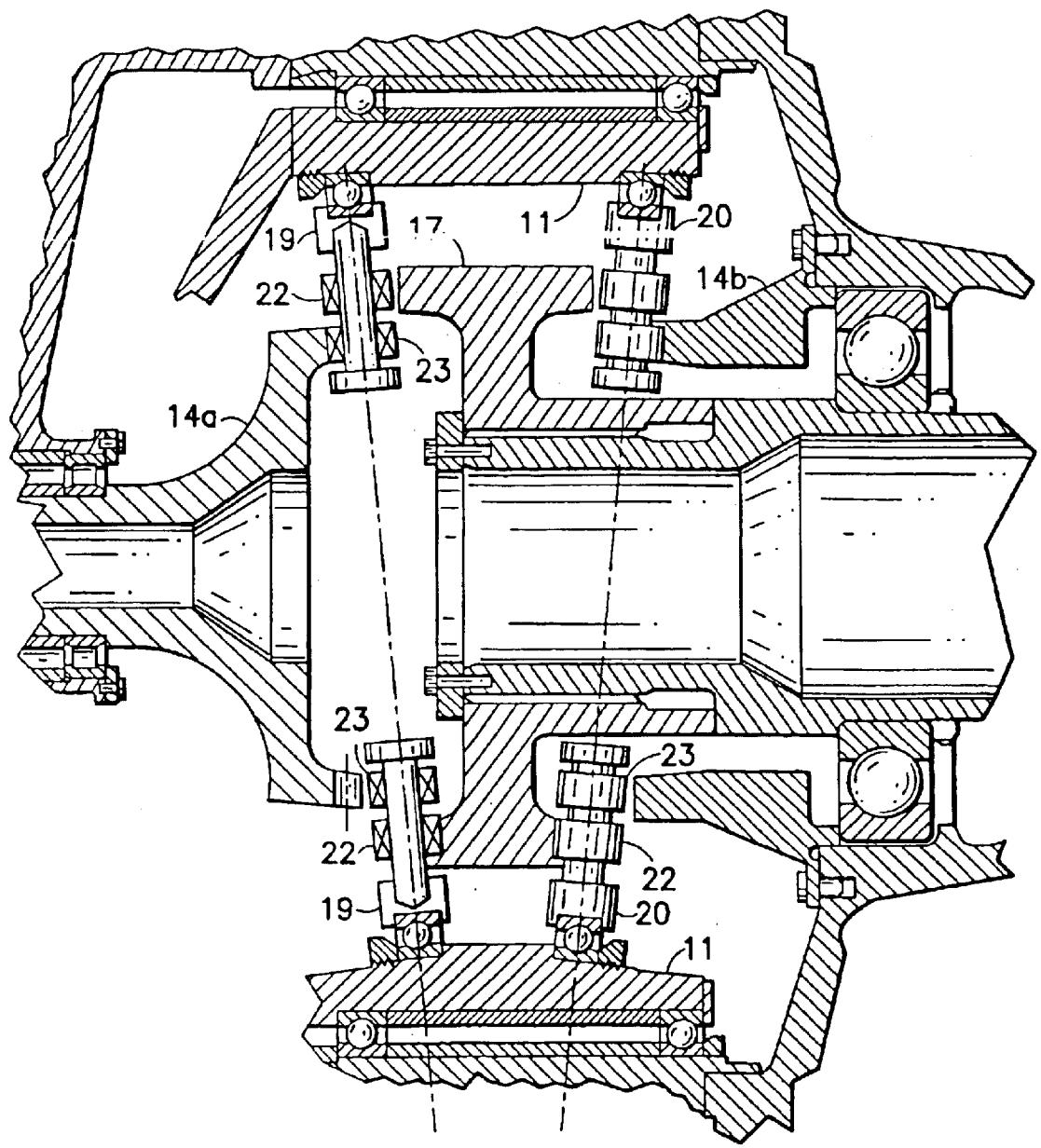
FIG. 3 is a side elevation view, in section, similar to FIG. 1, but illustrating this embodiment of the invention in greater detail, specifically showing multi-roller contacts occurring simultaneously at diametrically opposite quadrants of the invention.

Referring now to FIGS. 1, 2, and 3, there is shown by means of cross sectional views, one embodiment 10 of a variable power transmission incorporating features of the present invention. Although the variable power transmission concept of the invention will be described with reference to the embodiments shown in the drawings, it should be understood that the present invention can be embodied in many alternate forms or embodiments. In addition, any suitable size, shape or type of elements or materials could be used The variable speed power transmission 10 includes a rotatable split power pericyclic motion converter retaining ring member 11 journaled to the upper housing 15a that is attached to an input drive shaft 12 of a prime mover (not shown), via a bevel gear set 13 or face gear set (not shown), a rotatable coaxial reaction control rotor 14a connected to the lower stationary housing 15b via a pair of rolling element bearings 16a and 16b, a coaxial driving member 17 connected to the output shaft 18, and a stationary coaxial reaction member 14b connected to a stationary cover 15c. The pericyclic retaining ring member 11 embodies a set of two journaled concentric ring assemblies 19 and 20 with inner and outer rings separated by spoke pins 21 equally spaced such that each embodies an outer roller 22 and an inner roller 23. These two sets of pericyclic motion converter ring assemblies 19 and 20 that incorporate equally spaced spoke type pins 21 with outer rollers 22 and inner rollers 23, are journaled to the pericyclic motion converter retaining ring member 11 at a calculated design coning angle to achieve nutation motions.

In high load capacity and higher speed drive train systems, "split power" transmissions are typically designed to facilitate increased power density by providing a dual torque/load path from a prime mover to the output member (usually an output shaft) that drives the final system unit. Such a design is dimensionally more compact than conventional designs. The split power design configuration also provides an additional benefit to nutational types of transmissions by eliminating a pair of counter weights that would be necessary to eliminate dynamic imbalance caused by the nutational motion of the pericyclic motion converter due to its mounting arrangement, that is, at a design coning angle to the input shaft center line. Although the pericyclic motion converter is statically balanced, dynamic thrust forces develop due to moment loads created by the nutational motion. However, the split power design overcomes the dynamic imbalance via thrust force cancellation.

The two reaction members 14a and 14b are designed as circular faceplates that incorporate equally spaced individual conjugate convoluted type roller raceways 28a and 28b around their periphery to facilitate the reaction of contact forces during each pericyclic path of action of the two pericyclic motion converter ring assemblies 19 and 20. The driving member 17 is also designed as a circular faceplate with individual conjugate convoluted type roller raceways 30a and 30b (FIG. 2) around its periphery to achieve torque transmission at variable design speeds of the output shaft 18. The unique individual convoluted and enveloping conjugate roller raceways cams 28a and 28b and 30a and 30b, respectively, around the periphery of the reaction members 14a and 14b and the dual face cam driving member 17 are designed to kinematically and dynamically take advantage of the inherent high load capacity and efficiency of high precision rolling element bearings.

The flexible component arrangements of the present invention make it feasible to infinitely vary its speed ratio capability and make a selection of different individual speed ratios with the same components. This capability is made possible by changing the effective difference in angular raceway spacing (or angular positioning) between the driving and reaction members 17 and 14a and 14b via an actuator controller. The operation of the variable speed power transmission 10 is as follows: the input drive shaft 12 rotates the pericyclic motion converter retaining ring member 11 via a bevel gear set 13 to permit nutation or oscillatory type motion of the two pericyclic motion converter ring assemblies 19 and 20 via roller-raceway engagement with reaction control rotor members 14a and 14b and simultaneous roller-raceway engagement with the output driving member raceways 17 resulting in the conversion of nutation type motion to rotary motion of the output shaft 18. Different speed ratios at the output shaft 18 can be achieved by adjusting the rotational speed of the reaction control rotor member 14a.

It is envisioned that the oscillator arrangements in the pericyclic member 11 could be replaced by a single oscillator arrangement. It is envisioned that the principles of this invention can be employed in many devices, namely having an input member, a reaction member driven by the input member, a pericyclic member or oscillator member driven by the input member and a drive member driven by the pericyclic member, in which the rotation speed of the reaction member and or the pericyclic member can be controlled independent of the input member; thereby, allowing the speed reduction/increase at the drive member to vary. It is also envisioned that the drive member can rotate in a direction opposite of the input member and that the drive member can be placed in a coasting or neutral position so that there is not translation of energy from the input member.

Consider now the kinematics of the variable speed power transmission concept of the present invention. The split power pericyclic assembly 11 embodies a set of two journaled concentric ring units 19, 20 separated by a selected number of equally spaced spoke type pins 21 that each journal an outer roller 22 and inner roller 23. The two ring units 19, 20 are journaled to the rotatable pericyclic ring member 11 at a calculated design coning angle to facilitate oscillatory or wobble type motion of ring units 19, 20. The reaction member 14a, which is journaled to the housings, is designed as a circular face plate that incorporates a selected number of equally spaced conjugate convoluted roller raceways 28a around its periphery to facilitate the reaction of contact forces during each pericyclic path of action. The output driving rotor member 17 which is connected to the output shaft 18 is designed as a double circular faceplate with back to back convoluted type roller raceways 30a, 30b around its periphery to provide rotary torque transmission at design speeds of the output shaft 18. The stationary reaction member 14b which is attached to the housing is also designed as a circular face plate that incorporates a selected number of equally spaced conjugate convoluted roller raceways 28b around its periphery to facilitate the reaction of contact forces during each pericyclic path of action.

Rotation of the input shaft 12 causes oscillatory or wobble type motion of the journaled pericyclic ring units 19, 20 that embody outer rollers 22 and inner rollers 23. The pericyclic ring unit rollers simultaneously engage a full quadrant of the reaction members 14a, 14b and a full quadrant of the output driving rotor member 17. More specifically, the inner rollers 23 engage the reaction member 14a and the outer rollers 22 engage the output driving rotor 17. In this manner, the transmitted load is shared by fifty percent (two quadrants) of the rollers and the conjugate convoluted roller raceways 28a, 30a and 28b, 30b respectively as shown in FIG. 2. As a result of the unusual kinematic/kinetic features of the pericycler, the rotation of the input shaft 12 relative to the reaction members 14a, 14b causes a differential motion of the output driving rotor member, thereby permitting controlled variable speed without any significant power loss.

The geometry of the conjugate convoluted roller raceways 28a, 28b and 30a, 30b (FIG. 2) is determined from the path of motion of a fixed point on the pericycler ring units as the input shaft rotates the journaled split power pericyclic assembly member 11 and the rollers 22 and 23 engage the reaction members 14a, 14b thereby driving the output driving rotor member 17. One 360 degree rotation of the input shaft 12 results in one complete spherical pericyclic path of action. The following kinematic treatment determines the angular velocities of the input shaft 12 and the pericycler ring units and ultimately defines the conjugate convoluted roller raceways of the reaction members and the output driving rotor member 17.

Figure 4:
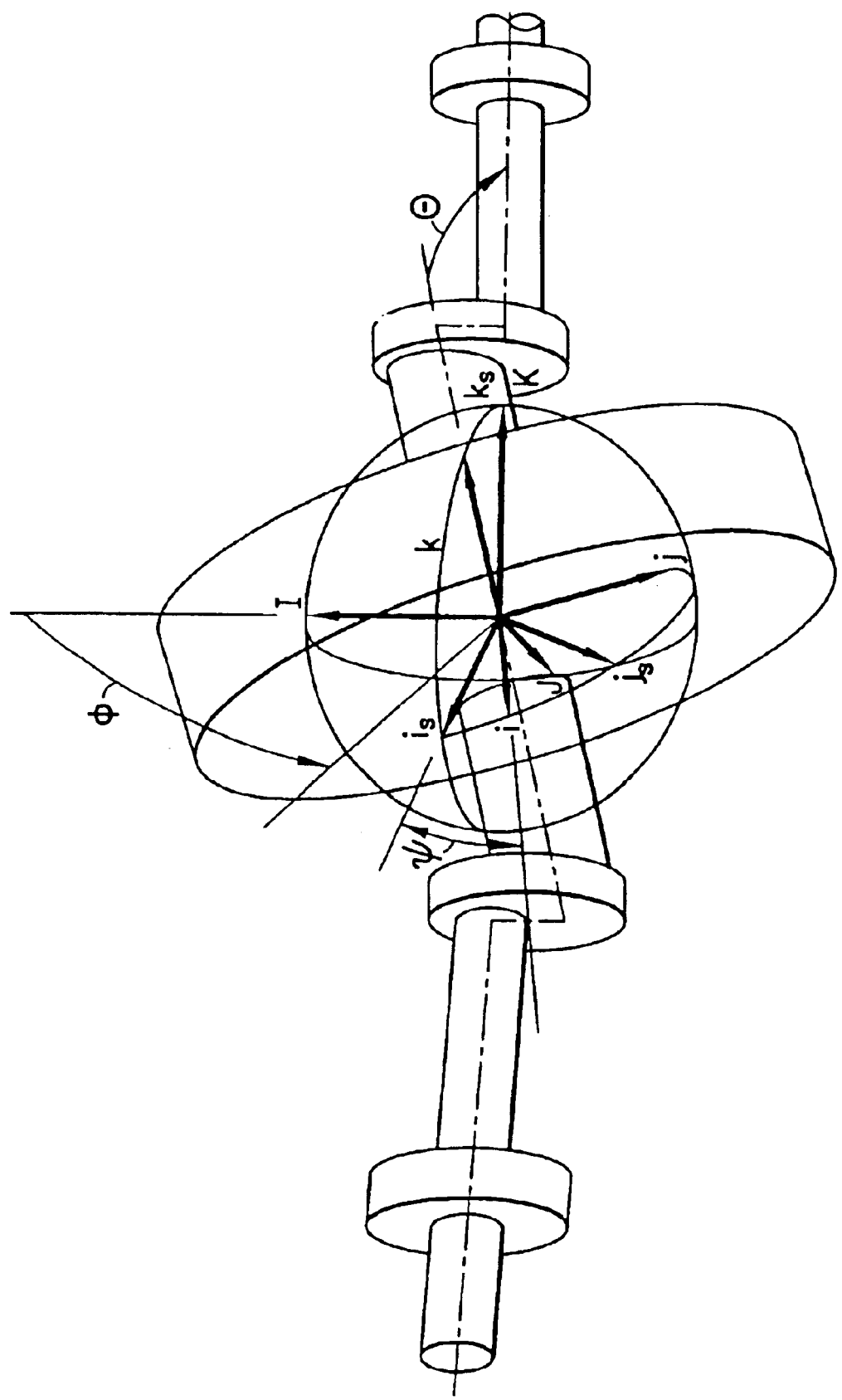
FIG. 4 is a diagrammatic view of a model for deriving pertinent information relating to the pericycler unit.

Three sets of right-handed orthogonal unit triads are shown in FIG. 4. FIG. 4 is a diagrammatic representation of a model for deriving the angular velocity of the pericycler and its position as a function of input shaft rotation to establish the path of a fixed point in the pericycler which defines the spherical path along which it moves during one raceway traverse on the reaction member. The coordinates for machining the reaction and output rotor face cams are also established from this model.

$$\xi = -\tan^{-1}\left(\frac{R_2}{R_1}\right) \quad (11)$$

$$\eta = \tan^{-1}\left(\frac{R_3}{\sqrt{R_1^2 + R_2^2}}\right)$$

Figure 5:
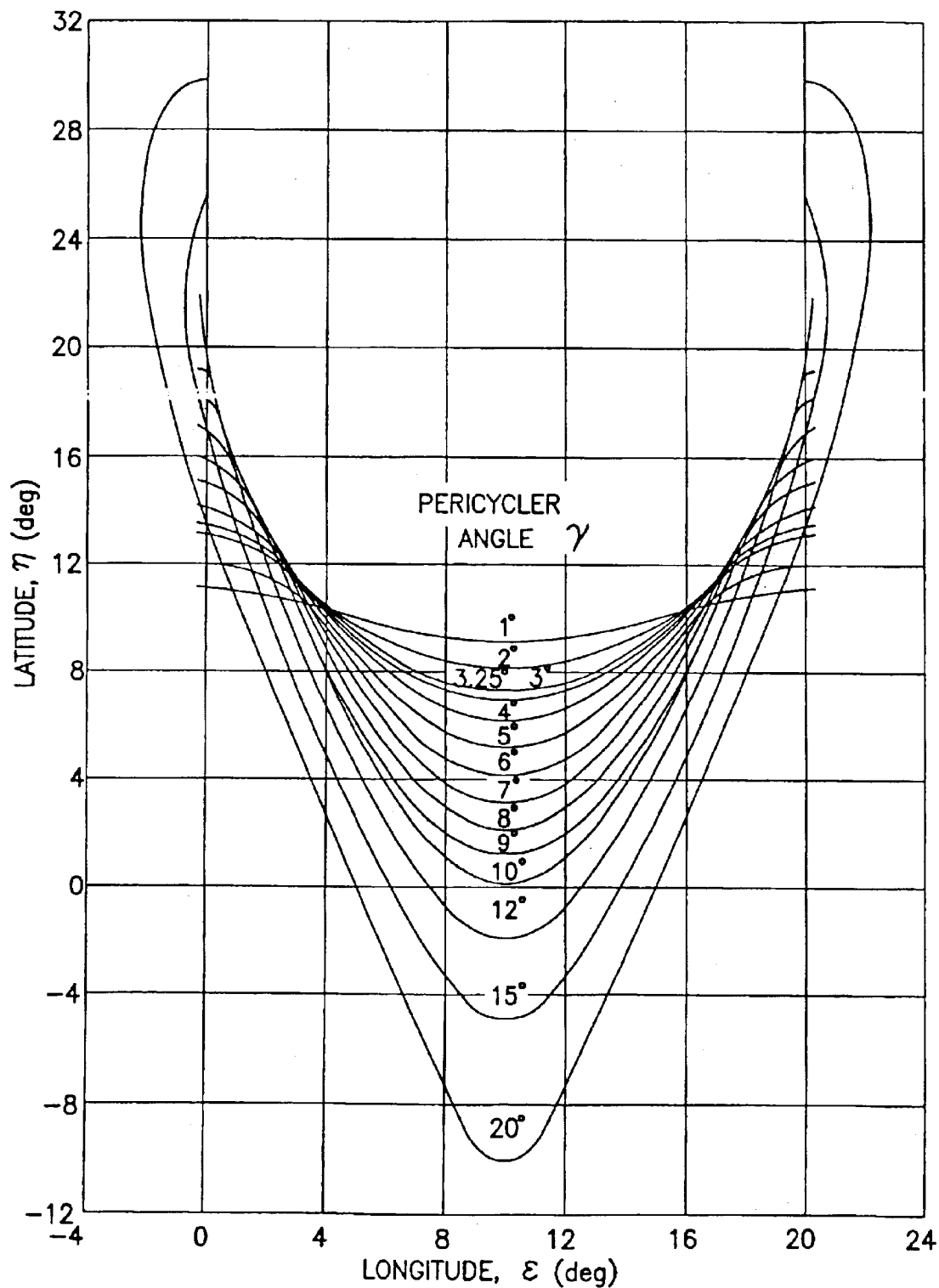
FIG. 5 is a graph depicting the path along which the center of a follower member of a pericyclic motion converter moves during a one revolution traverse while in engagement with the reaction control rotor as plotted for a plurality of values of pericyclic angle gamma.

For β=10° and λ=18/19, i.e., 18 raceways on the reaction members meshing with 19 rollers on the pericycler, ξ and η are plotted for various values of pericycler angle γ in FIG. 5. These profiles actually denote the path along which the center of a roller will move during one raceway traverse on the reaction members.

Figure 6:
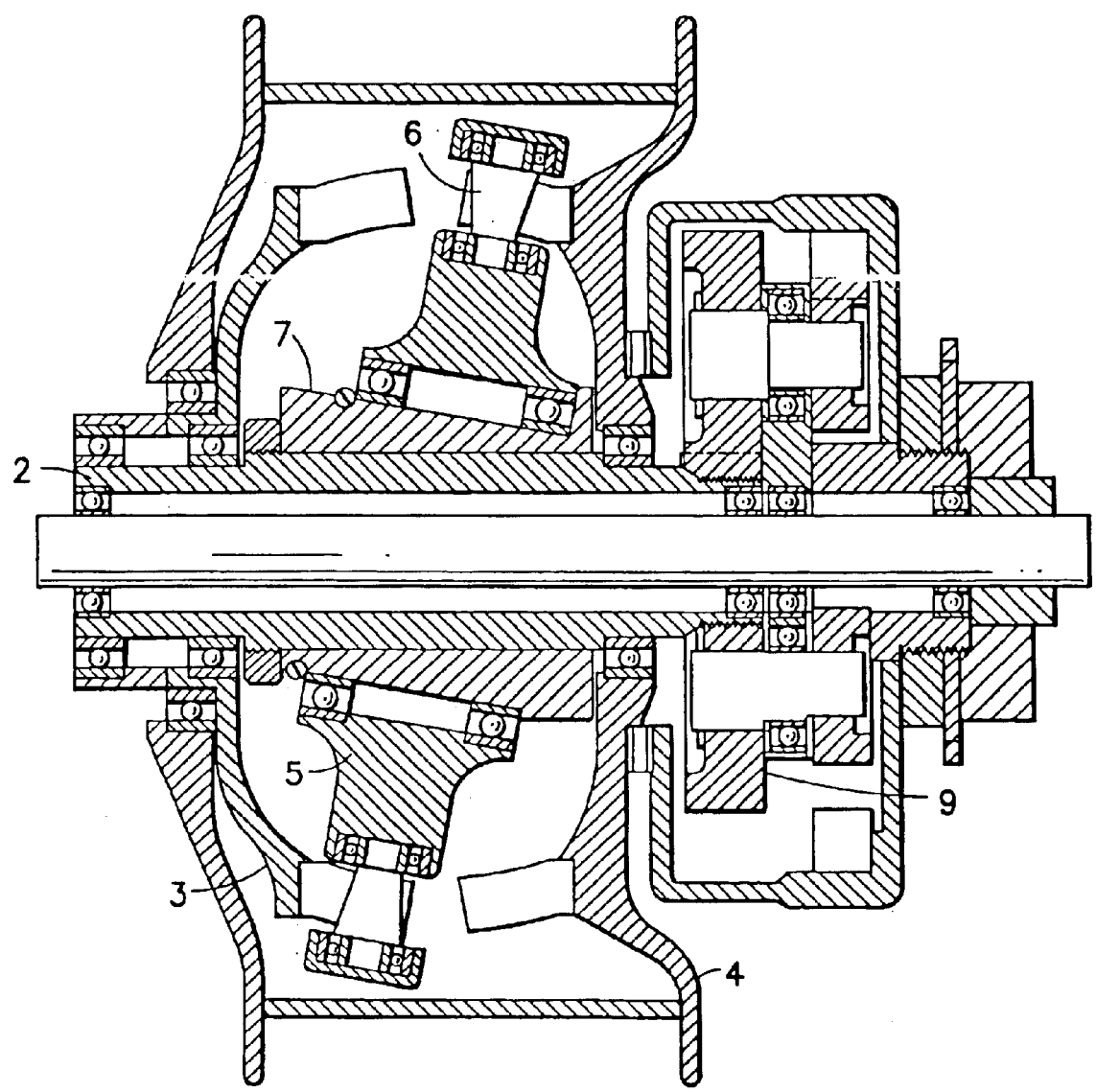
FIG. 6 is a cross sectional view in elevation of a prototype design of the present invention that is typical for mounting in a wheel hub of a vehicle.

A prototype design of the present invention, as seen in FIG. 6 has been fabricated and tested to verify its capability to function as a stepless variable speed transmission. This prototype PVT (Pericyclic Varydrive Transmission) is an example of its application to human powered vehicles including bicycles, scooters, wheel chairs, carts, etc. and for power-assisted human powered vehicles utilizing electric motors and control electronics to augment the user's effort. This prototype PVT can be mounted inside the hub of a bicycle rear wheel to facilitate stepless speed changes over a ratio range of about 0.535 to about 4.457. With such a construction, the PVT will likely eliminate the state-of-the-art derailleur/multi-sprocket system that permits only a relatively few step ratio speed changes.

The prototype PVT comprises a pericyclic member 5 journaled to the input shaft 2 at a designed angle 7 to permit oscillatory motion and thereby continuous torque transmitting engagement with a journaled reaction member 3 and simultaneously with an output driving member 4. For the bicycle application, the input speed is augmented, that is, increased, by a planetary gear set 9 having, for example, a 6:1 ratio. The pericycler member embodies a set of equally spaced rollers 6 that mesh with the convoluted type raceways of the reaction member 3 and the output driving member 4.

The output speed of the PVT can be varied by changing the reaction member 3 rotational speed with respect to the input shaft rpm. Maximum output speed is designed to decrease proportionately with increasing reaction member speed. The reaction member is counter rotating, that is, its rotation is in the opposite direction with respect to the input rotation.

To facilitate application in which the designs require "low speed ratio ranges such as 0.5:1 to 5.6:1 which is typical for bicycles, an augmentation member is used to increase the basic input ratio to approximately 10:1. This provides an efficient rate of rotation of the reaction control rotor relative to the input member for a design variable speed output range of 0.5:1 to 5.6:1. The augmentation member can be a planetary gear or other in-line mechanical gear member.

The PVT design features that influence the output speed are as follows:

| | |
|---|---|
| Number of reaction member raceways, Nrm | 8 |
| Number of output driving member raceways, Nom | 10 |
| Number of pericyclic rollers, Npr | 8 |
| Planetary speed increase ratio, Rpl | 6:1 |

Figure 7:
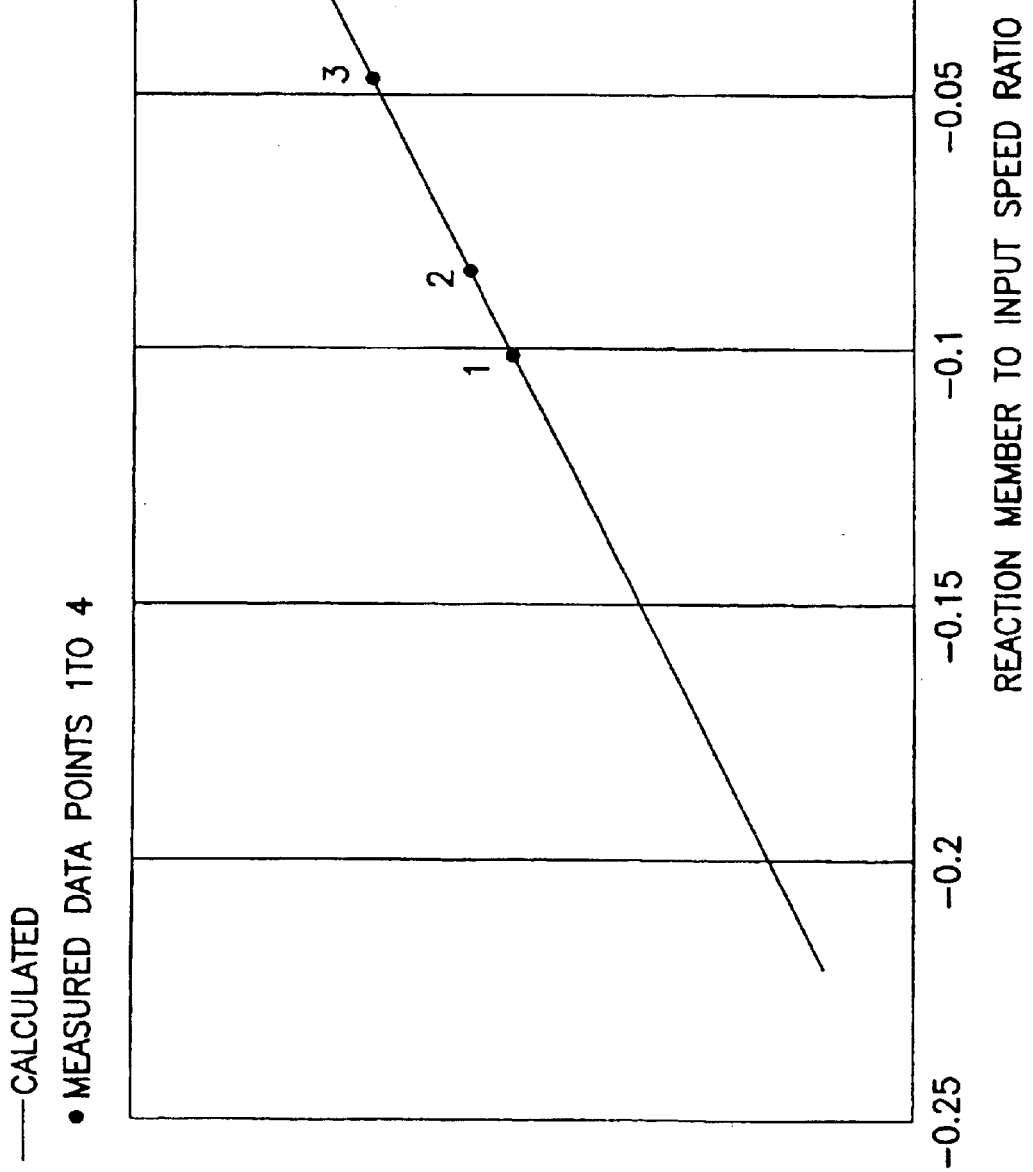
FIG. 7 is a graph of calculated, and four measured data points, of the output speed ratio V as a function of the reaction member speed ratio $R_{rm}$.

The reaction member speed ratio (Rpl) is defined as the ratio of reaction member speed rotation and the PVT input speed. The variable output speed ratio (V), (ratio of output speed to the input speed) is calculated by the following equations:

$M=(Nom \times Npr)/(Nom \times Npr - Npr \times Nrm)$ where M is the maximum PVT ratio of input to output with the reaction member fixed; and $V=Rpl \times (1+Rm \times [M-1])/M.$ FIG. 7 is a graph of calculated output speed ratio V as a function of the reaction member speed ratio Rrm, and shows the linearly variable output speed capability of the prototype PVT unit.

The variable output speed capability of the prototype PVT unit was verified by measuring the rotational speeds of the input shaft 2, reaction member 3 and the output driving member 4. The component member speeds were measured by timing each member for a selected number of rotations (that is, by measuring the time required for 30 revolutions of the input shaft 2, 10 revolutions of the reaction member 3 and 60 revolutions of the output driving member 4. The reaction member 3 speed was increased progressively from zero up to a maximum speed that could be visually counted. Thus, various component rotational speeds were measured for four separate speed settings of the reaction member 3. At each of these speed settings, three measurements were made to minimize potential errors. Table 1 summarizes the measured times in seconds and rotational speeds in rpm for the respective components. Table 1 also shows the speed ratios of the reaction member (Rrm) and the overall output ratios for the respective measurements.

Table 2 compares the calculated and measured output ratios as a function of the ratios Rrm for the reaction member 3. As shown in FIG. 7, the measured data corresponds very closely with the calculated values of the output ratios for the speed settings of the four reaction members 3 evaluated.

TABLE 1

Measured Times and Speeds of PVT Input Member, Reaction Member, and Output Member

| | Input Member Speed | | Reaction Member Speed | | | Output Member Speed | | |
|---|---|---|---|---|---|---|---|---|
| | 30 Rev. Time | RPM | 10 Rev. Time | RPM | $R_{RM}$ Ration | 60 Rev. Time | RPM | Output |
| I. | 15.39 | 116.959 | — | 0 | 0.000 | 25.48 | 141.287 | 1.208 |
| | 15.34 | 117.340 | — | 0 | 0.000 | 25.60 | 140.625 | 1.198 |
| | 15.35 | 116.883 | — | 0 | 0.000 | 25.55 | 140.900 | 1.205 |
| II. | 15.69 | 114.723 | 18.55 | −32.345 | −0.047 | 32.37 | 111.214 | 0.969 |
| | 15.70 | 114.650 | 18.46 | −32.503 | −0.047 | 32.04 | 112.360 | 0.980 |
| | 15.56 | 115.681 | 18.64 | −32.189 | −0.046 | 31.85 | 113.030 | 0.977 |
| III. | 15.30 | 117.647 | 10.02 | −59.880 | −0.085 | 38.45 | 93.628 | 0.796 |
| | 15.35 | 117.264 | 9.96 | −60.241 | −0.086 | 38.28 | 94.044 | 0.802 |
| | 15.33 | 117.417 | 10.01 | −59.940 | −0.085 | 38.26 | 94.093 | 0.801 |
| IV. | 15.47 | 116.354 | 8.72 | −68.807 | −0.099 | 42.98 | 83.760 | 0.720 |
| | 15.38 | 117.035 | 8.30 | −72.289 | −0.103 | 42.98 | 83.760 | 0.716 |
| | 15.44 | 116.580 | 8.54 | −70.258 | −0.100 | 42.69 | 84.329 | 0.723 |

TABLE 2

Average Speed Ratios

| Reaction Member | Output to Input Ratio | |
|---|---|---|
| $R_{RM}$ Ratio | Calculated | Measured |
| I. 0.000 | 1.200 | 1.204 |
| II. −0.047 | 0.974 | 0.976 |
| III. −0.085 | 0.792 | 0.800 |
| IV. −0.101 | 0.715 | 0.714 |

Notes
1. $R_{rm}$ Ratio is the ratio of reaction member speed to the input speed.
2. Output ratio is the ratio of output speed to the input speed.

In conclusion the variable stepless output speed capability of the prototype PVT unit was verified. The output speed ratio varies linearly with increasing ratio Rrm for a reaction member 3 from a maximum output speed for a stationary (Rrm=0) reaction member 3. The output speed decreases linearly.

Turn now to FIGS. 8–17 for the description of another embodiment of the invention. In this instance, beginning with FIGS. 8–10, a continuously variable speed power transmission 200 includes an input member 202 in the form of longitudinally extending drive shaft 204 rotatable about an input axis 206. An output member 208 includes a longitudinally extending driven shaft 210 and an integral output disk 212 lying generally in a plane perpendicular to an output axis 214 about which driven shaft 210 rotates. The output disk 212 includes a solid web 213 which is splined or otherwise fixed to the driven shaft 210 and extends between a hub 216 fixed on the driven shaft and an outer peripheral flange 218 lying in a plane parallel to the output axis containing a plurality of rearwardly directed output face cams 220.

Figure 8:
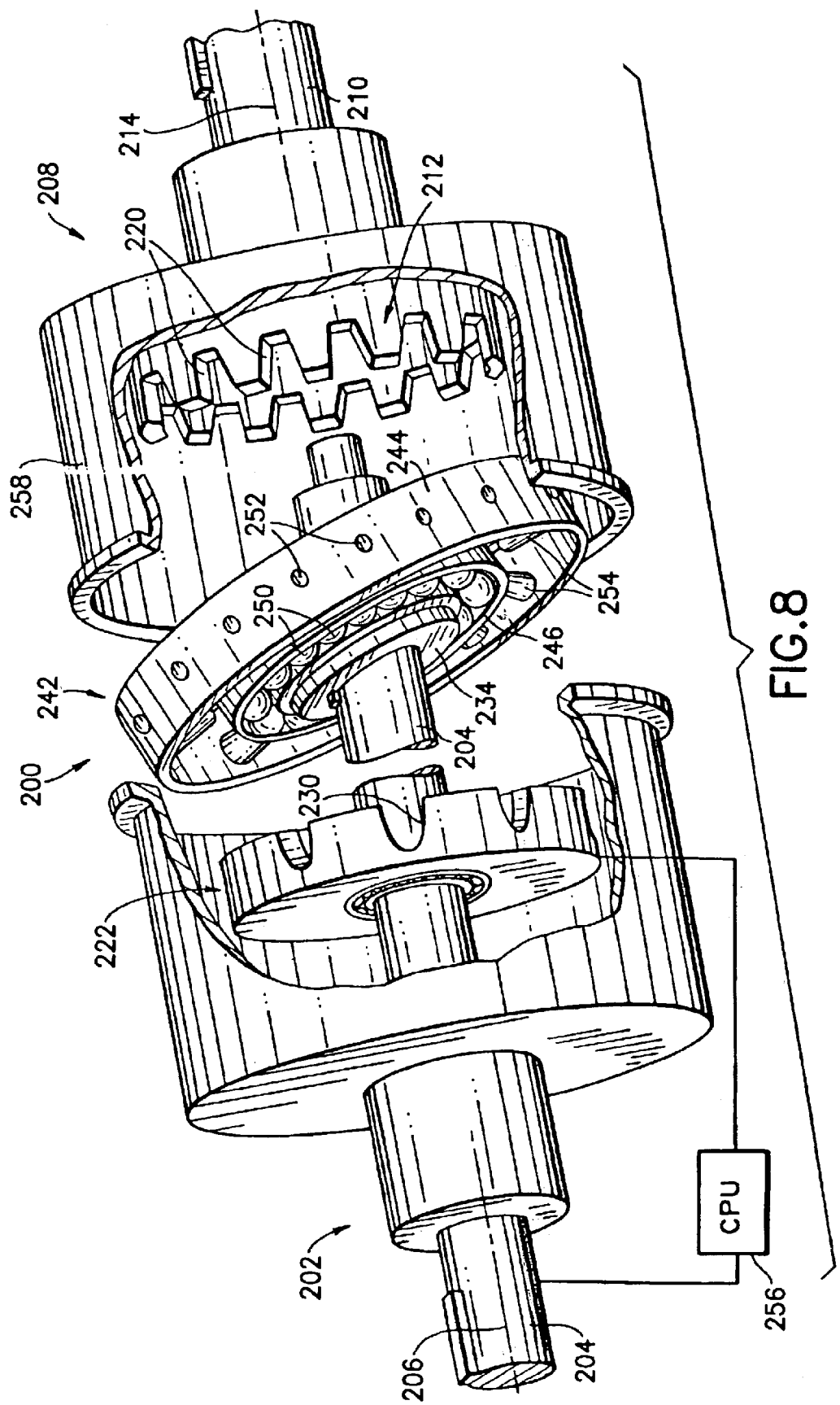
FIG. 8 is an exploded perspective view, partially cut away and shown in section, of another embodiment of the continuously variable power transmission of the present invention.
Figure 9:
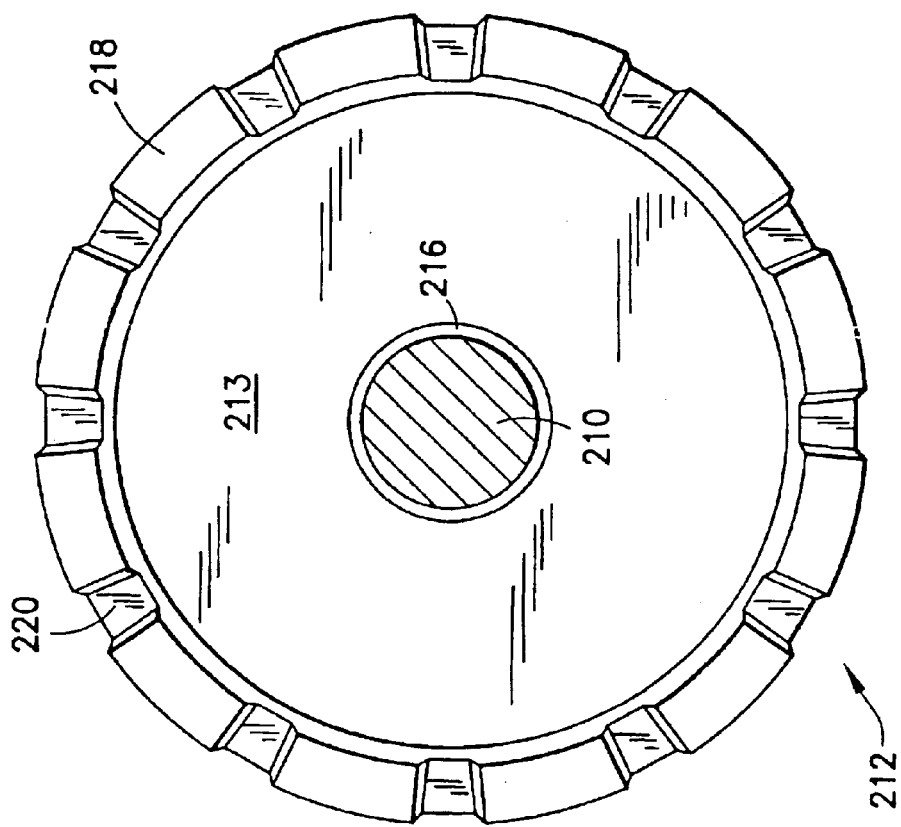
FIG. 9 is a detail elevation view illustrating an output disk which is a component of the power transmission illustrated in FIG. 8.
Figure 10:
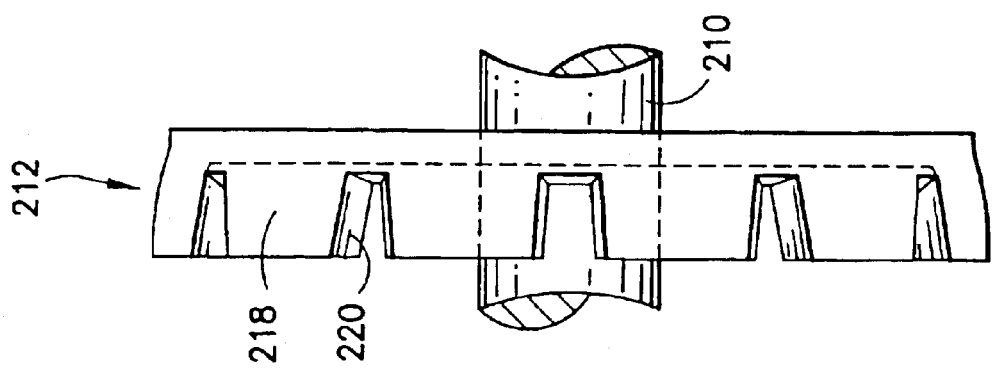
FIG. 10 is a detail side elevation view of the component illustrated in FIG. 9.
Figure 11:
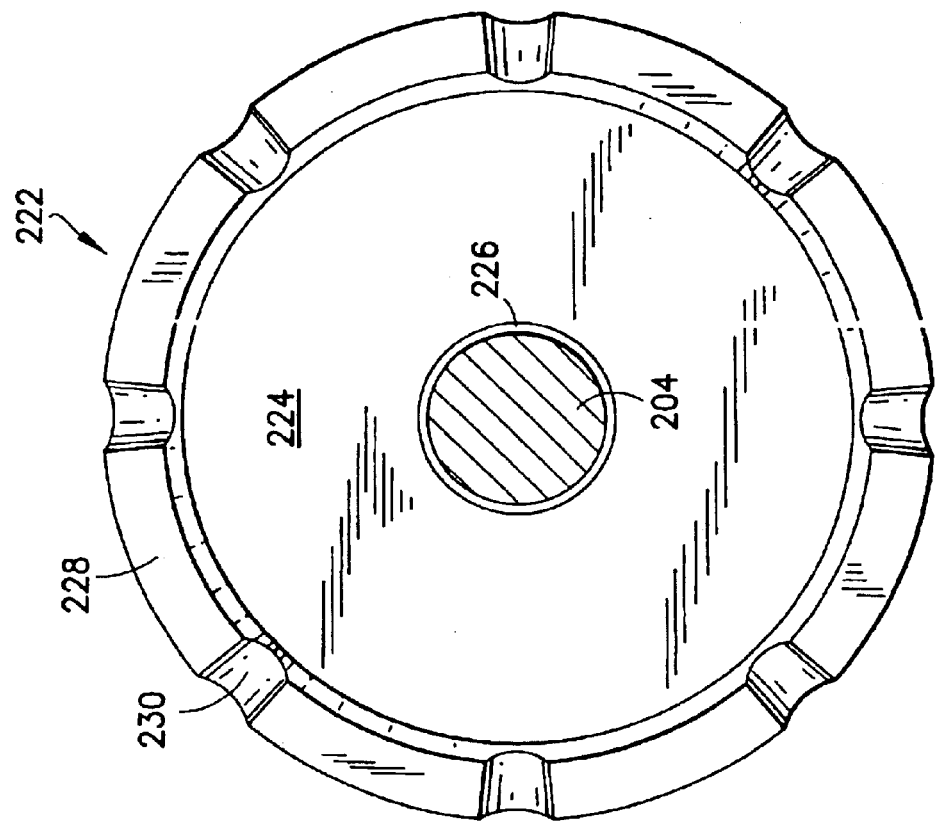
FIG. 11 is a detail elevation view illustrating a reaction control rotor which is a component of the power transmission illustrated in FIG. 8.
Figure 12:
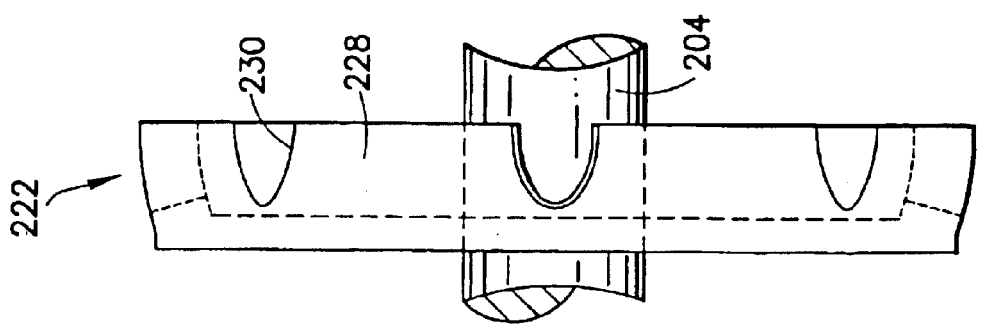
FIG. 12 is a detail side elevation view of the component illustrated in FIG. 11.

Viewing now FIGS. 8, 11, and 12, a reaction control rotor 222 is mounted for selective rotation about the input axis 206. The reaction control rotor 222 includes an input disk or web member 224 lying in a plane perpendicular to the input axis and extending between a hub 226 rotatably mounted on the drive shaft 204 and an outer peripheral flange 228 lying in a plane parallel to the input axis containing a plurality of forwardly directed reaction face cams 230 positioned in opposition to the output face cams 220 on the output member 208.

Figure 13:
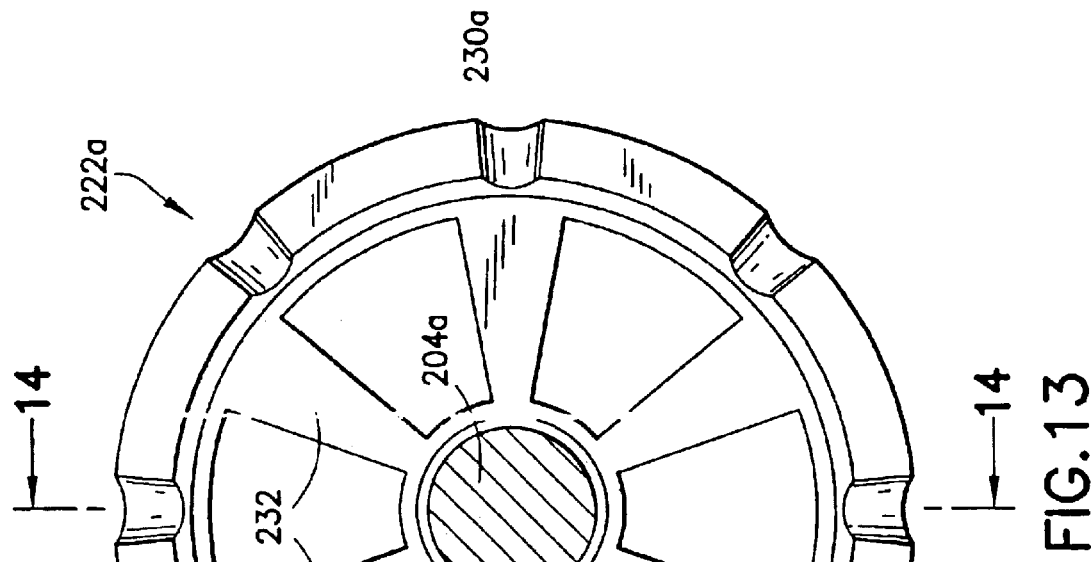
FIG. 13 is a detail elevation view illustrating a reaction control rotor which is a component of the power transmission illustrated in FIG. 8.
Figure 14:
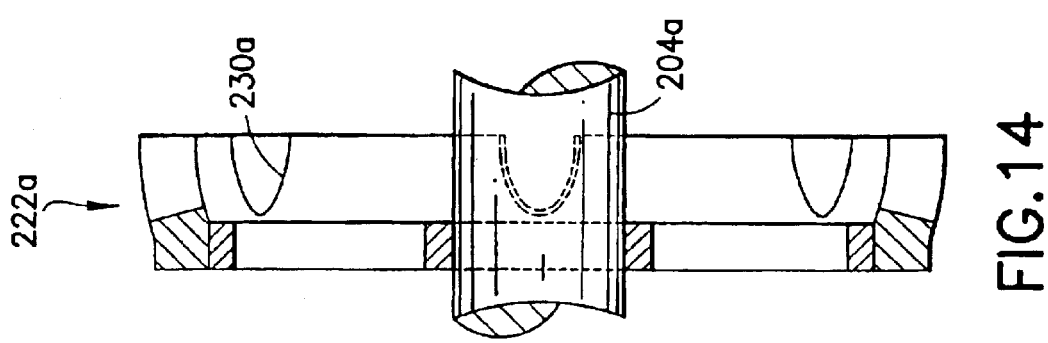
FIG. 14 is a detail side elevation view of the component illustrated in FIG. 13.

In a modified embodiment of the invention illustrated in FIGS. 13 and 14, a reaction control rotor 222a may include a hub 226a fixed on a driven shaft 204a, an outer peripheral flange 228a lying in a plane parallel to the output axis and containing a plurality of forwardly directed reaction face cams 230a, and a plurality of radially extending spokes 232 at circumferentially spaced locations extending between and integral with the hub 226a and with the outer peripheral flange. Although not illustrated, the output disk 212 may be similarly modified to include a plurality of radially directed spokes in place of the solid web member 213.

Figure 15:
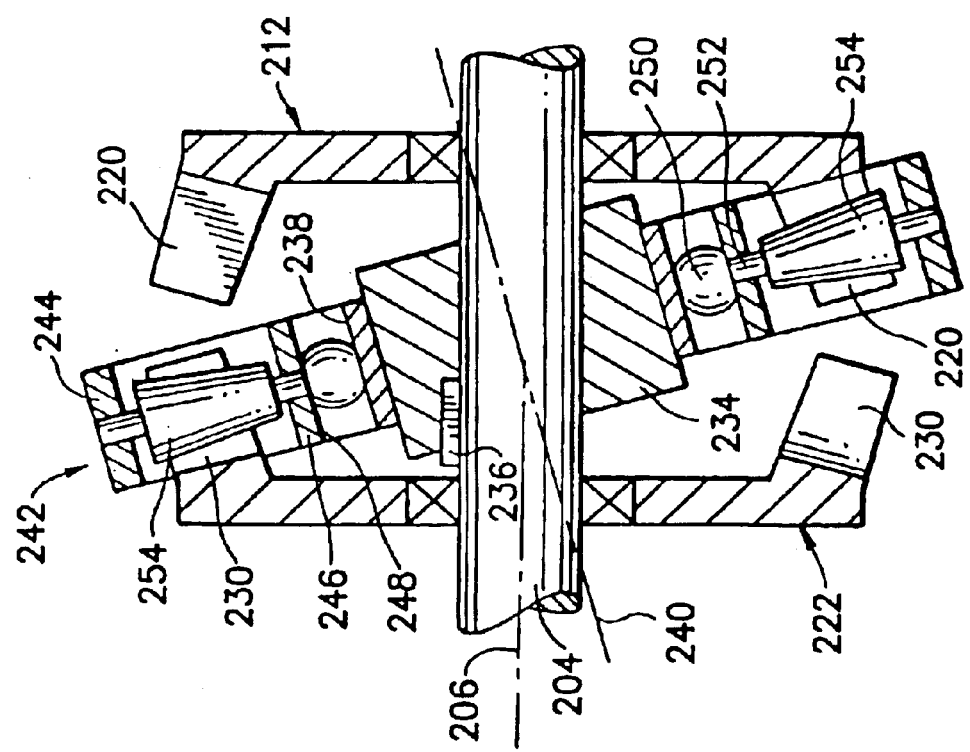
FIG. 15 is a detail elevation view, in section, of a pericyclic motion converter which is a component illustrated in FIG. 8.

With continued reference to FIG. 8 and now turning also to FIG. 15, the input member 202 is seen to include the longitudinally extending drive shaft 204 and a canted cam member 234 fixed on the drive shaft as by a key member 236. The canted cam member 234 has a first bearing track 238 and a cam axis 240 coplanar with the input axis 206 but angularly disposed relative to the input axis. The power transmission 200 further includes a pericyclic motion converter 242 which itself includes a peripheral ring 244 coplanar and coaxial with the canted cam member 234 and an intermediate ring 246 coplanar and coaxial with the canted cam member and having a second bearing track 248 spaced from and opposed to the first bearing track. In a customary fashion, bearing elements 250 are suitably received between and are engaged with the first and second bearing tracks 238, 248 enabling rotation of the intermediate ring about the canted cam member.

A plurality of radially extending follower pins 252 are fixed at circumferentially spaced locations extending between and integral with the peripheral ring 244 and with the intermediate ring 246 and a load transmitting follower member 254 such as a roller is rotatably mounted on each of the follower pins. As clearly seen in FIG. 15, a plurality of the load transmitting follower members 254 simultaneously engage at diametrically opposite locations with the output face cams 220 and with the reaction face cams 230.

Suitable control apparatus in the form of a central processor unit 256 is an integral and necessary part of the invention and serves to selectively adjust the rate of rotation of the reaction control rotor 222 relative to the input member or drive shaft 204. In one instance, the reaction control rotor 222 may be fixed for unitary rotation with the drive shaft and in other instances may rotate through a desired range of rates of rotation relative to the input shaft. In those instances in which relative rotation occurs between the reaction control rotor 222 and the drive shaft 204, both rotation and nutation of the pericyclic motion converter 242 result about the input axis 206 and thereby cause a change of ratio of the rotational speed of the output member 208 relative to the input member 202.

In the instance of the power transmission 200, a housing 258 may be suitably mounted on the input member 202 and on the output member 208 and encompass the mechanism describe for its protection, but, unlike the instance of the embodiment FIGS. 1–3, no interaction occurs between the housing 258 and the assembly comprising the reaction control rotor 222, the output disk 212 and the pericyclic motion converter.

Figure 17:
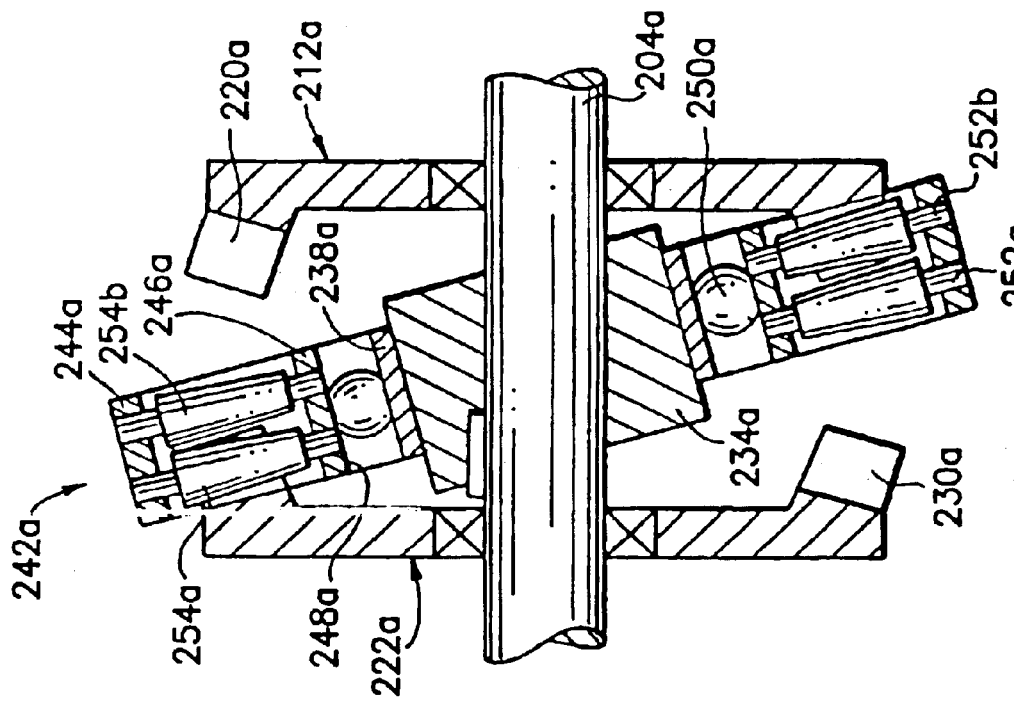
FIG. 17 is a detail elevation view, in section, of a modified pericyclic motion converter which is a component illustrated in FIG. 16.
Figure 16:
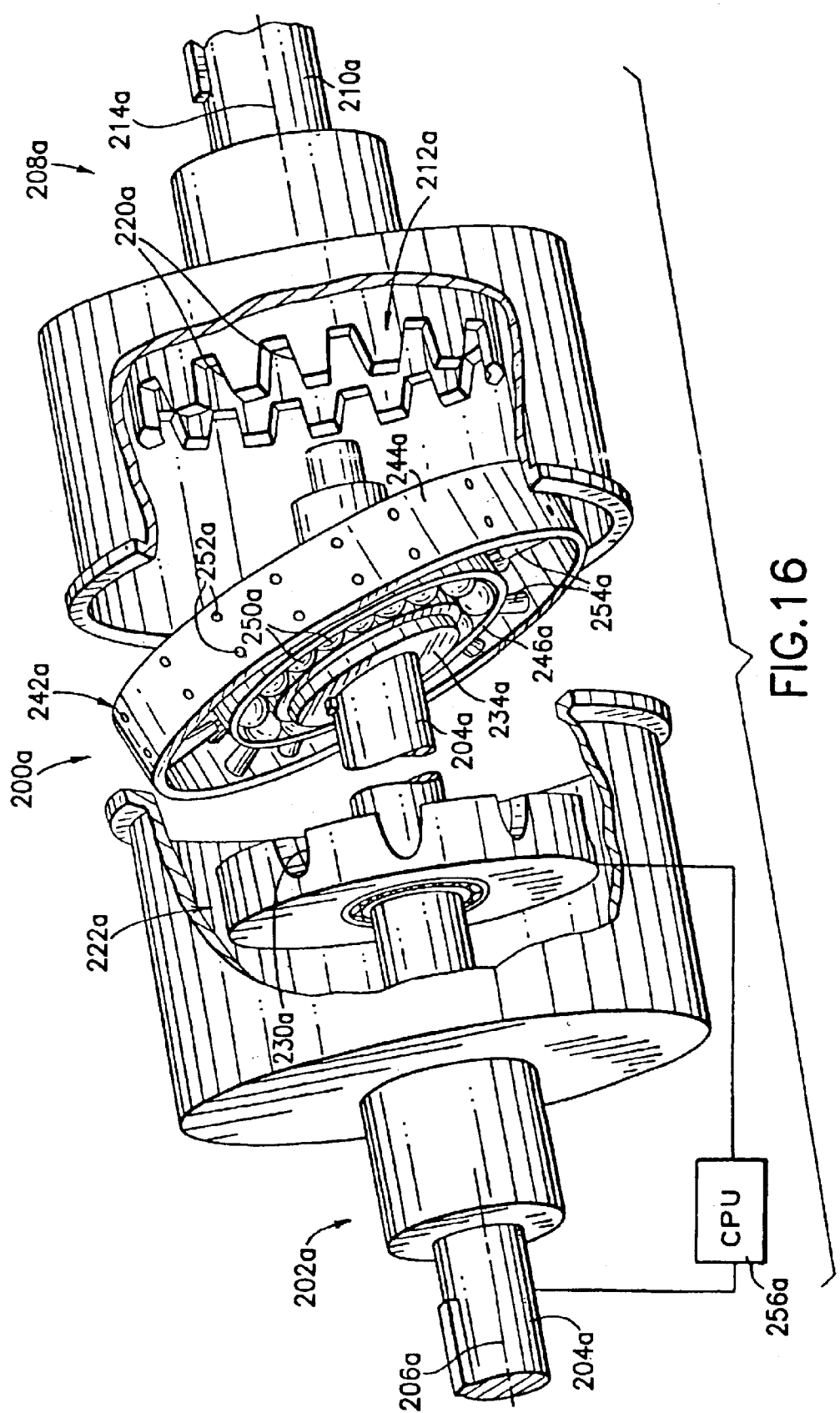
FIG. 16 is an exploded perspective view, partially cut away and shown in section, of still another embodiment of the continuously variable power transmission of the present invention.

Yet another embodiment of the invention can be seen with respect to FIGS. 16 and 17 which are generally similar to the construction of FIGS. 14 and 15. In this instance, similar components are similarly numbered but modified by use of the suffix "a". The modified variable speed transmission 200a differs from transmission 200 primarily in the provision of a pericyclic motion converter 242a which is of a moderately different construction than the pericyclic motion converter 242. More specifically, the pericyclic motion converter 242a includes a peripheral ring 244a coplanar and coaxial with the canted cam member 234a and an intermediate ring 246a coplanar and coaxial with the canted cam member. As in the earlier described embodiment, bearing elements 250a between and engaged with first and second bearing tracks 238a, 248a enable rotation of the intermediate ring about the canted cam member.

A first plurality of radially extending rearward follower pins 252a at circumferentially spaced locations extend between and are integral with the peripheral ring 244a and with the intermediate ring 246a, a load transmitting follower member 254a being rotatably mounted on each of the rearward follower pins. In a similar fashion, a second plurality of radially extending forward follower pins 252b at circumferentially spaced locations extend between and are integral with the peripheral ring 244a and with the intermediate ring 246a, a load transmitting follower member 254b being rotatably mounted on each of the forward follower pins 252b. The first plurality of rearward follower pins 252a and the second plurality of forward follower pins 252b lie, respectively, in spaced apart parallel planes. As clearly seen in FIG. 17, at any one time, a plurality of the load transmitting follower members 254a engage a number of the reaction face cams 230a along an arcuate reach of the reaction control rotor 222a even as a plurality of the load transmitting follower members 254b engage a number of the output face cams 220a along an arcuate reach of the output disk 212a at diametrically opposite locations of the pericyclic motion converter 242. In this manner, one set of the load transmitting follower members always rotate in one direction while the adjoining set always rotate in the opposite direction. Thus, the construction of FIGS. 16 and 17 avoids the shortcoming of the construction of FIGS. 14 and 15 which requires the follower members 254 to instantaneously change direction as they move out of engagement with the reaction face cams 230 and into engagement with the output face cams 220, and vice versa.

Figure 18:
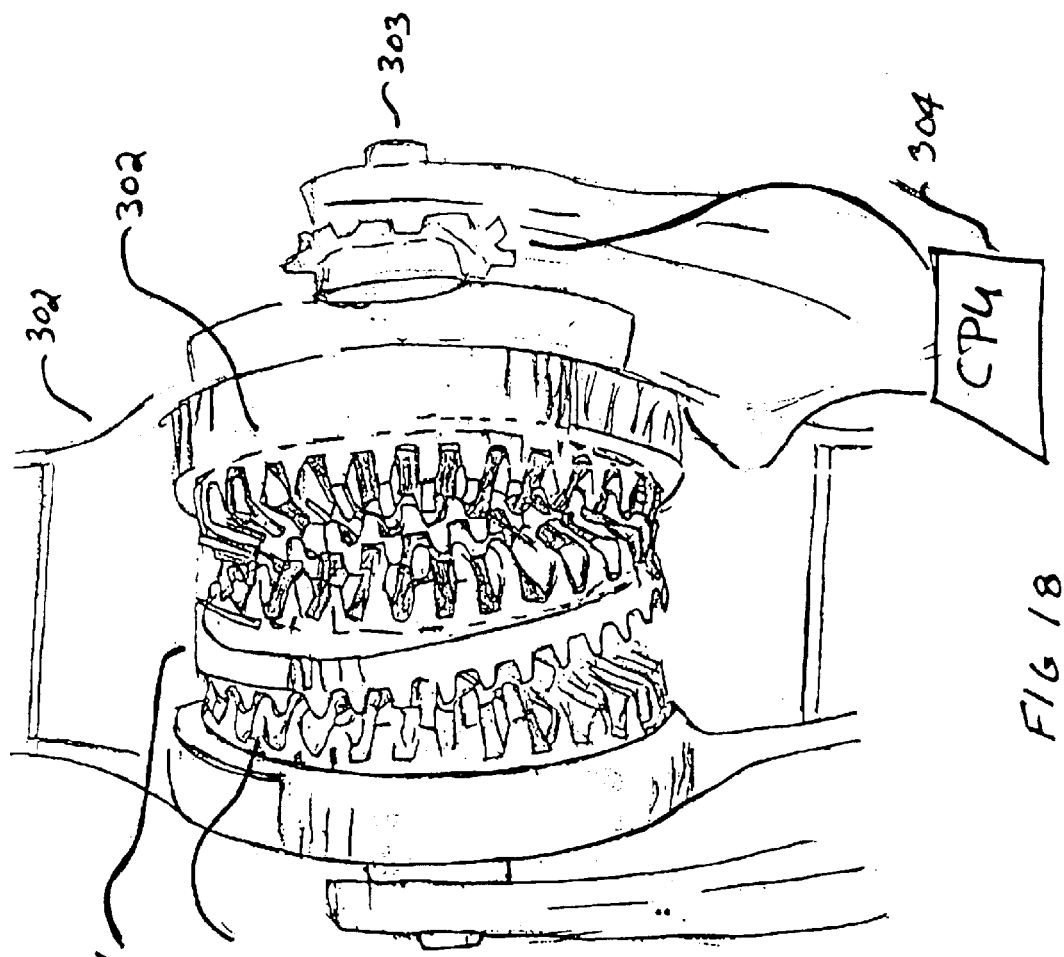
FIG. 18 is an exploded perspective view, partially cut away and shown in section, of an embodiment of the continuously variable power transmission of the present invention in a wheel hub of a vehicle
Figure 18A:
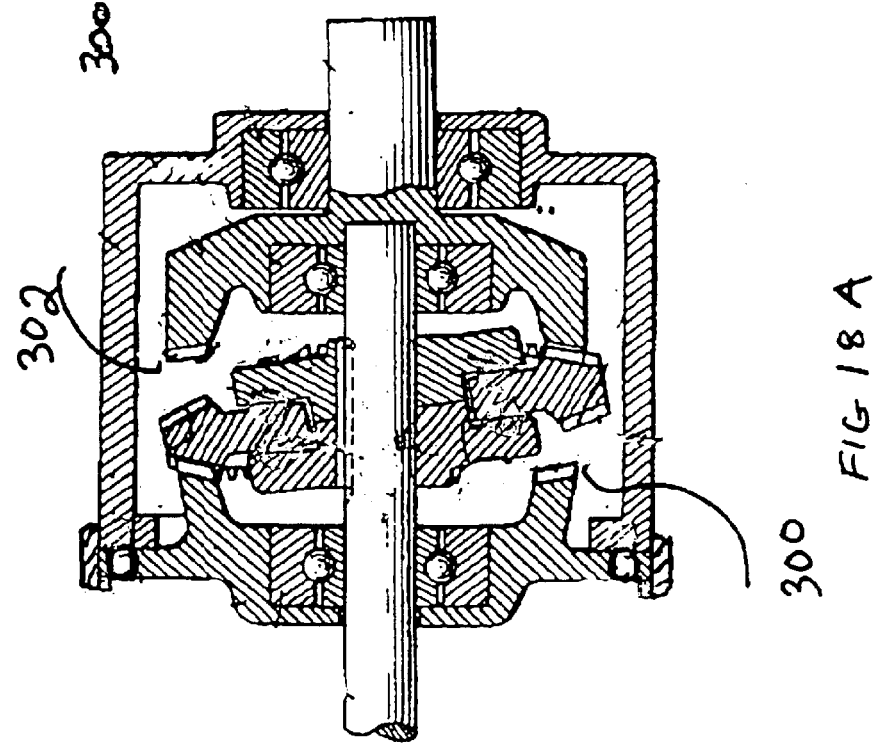
FIG. 18A is cross sectional view of the bevel gear embodiment of FIG. 18.

Another embodiment of the invention is shown in FIG. 18 which is shown for purposes of illustration in a vehicle wheel hub. This embodiment of the continuously variable power transmission may conveniently be employed in a large variety of vehicles. A CPU 304 is attached to the input shaft 303 and the output member 302 as discussed above with other embodiments of the present invention. A motion converter, preferably a conjugate motion converter 301, is similar in function to motion converters of other embodiments of the present invention discussed above. FIG. 18A shows the pitch angle of bevel gear teeth 300 of the reaction control rotor and bevel gear teeth 302 of the output rotor having pitch angles greater than 90 degrees.

A continuously variable speed power transmission system can embody conjugate external and internal face and bevel type gear teeth in place of reaction and output rotor face cams and motion converter rollers. A preferred embodiment of this type is shown in FIG. 18. This embodiment substantially simplifies the design and reduces manufacturing costs for assisted power vehicles and lower speed operating drives.

Figure 19:
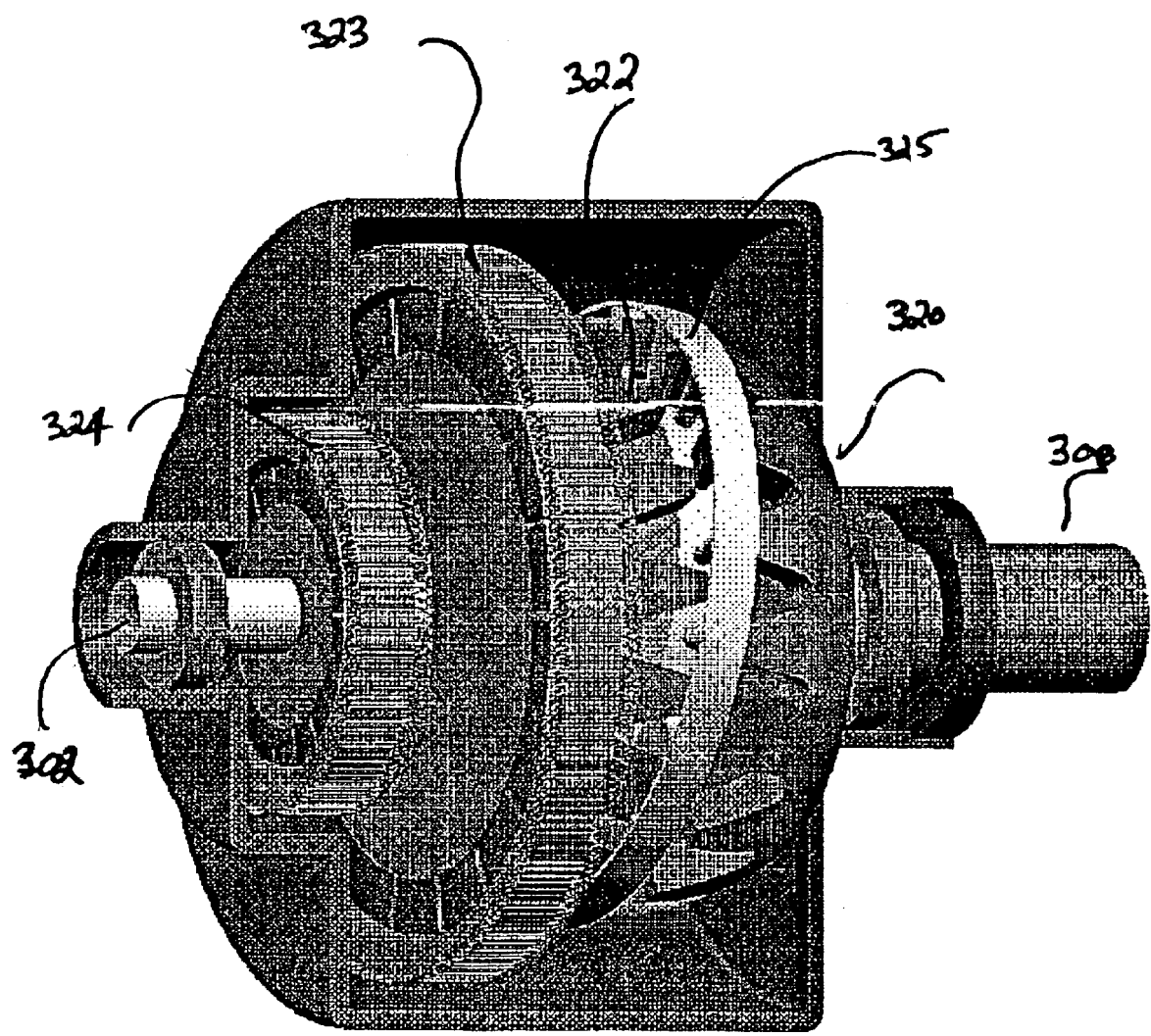
FIG. 19 is an exploded perspective view, partially cut away and show in section, of an electric motor/generator integrated with the continuously variable power transmission of the present invention.

Yet another embodiment of the invention is shown in FIG. 19. This embodiment has an input shaft 302, an output shaft 308, a reaction control rotor with face cams 322, a motion converter 325, DC speed control motor elements 324, and electric motor/generator elements 323.

The integrated motor/generator components, such as shown in FIG. 19, provide rotational (RPM) control means to the reaction rotor to facilitate desired ratio changes of the output rotor. The motors can also provide independent input power via a battery pack in addition to power supplied from a prime mover. One or both motors can act as generators for braking purposes. Also, both motors can operate in the same direction of rotation (e.g., clockwise) in a synchronized manner, thereby doubling the power. The holding of one of the motors steady allows the other motor to spin up, thereby controlling field current to the first motor; this will slow a vehicle and recharge the battery pack. A CPU is used to monitor and control each motor's RPM for all-wheel drive and anti-lock braking. This arrangement provides torque multiplication, very large ratios, and direct drive to vehicle wheels at very high efficiency and power density.

It should be understood that the foregoing description is only illustrative of the invention. Various alternatives and modifications can be devised by those skilled in the art without departing from the invention. Accordingly, the present invention is intended to embrace all such alternatives, modifications and variances which fall within the scope of the appended claims.

What is claimed is:

1. A continuously variable speed power transmission comprising:

an input member rotatable about an input axis;

an output member rotatable about an output axis including a plurality of rearwardly directed output rotor external face gear teeth thereon;

a conjugate reaction control rotor with integrated motor/generator components mounted for selective rotation about the input axis including a plurality of forwardly directed reaction external face gear teeth thereon in opposition to the output external face gear teeth on the output member;

a conjugate motion converter with internal face gear teeth having pitch angles greater than 90 degrees embodied on both sides thereof and rotatably mounted for nutational and rotational motion about the input axis that are simultaneously engageable with the output rotor external face gear teeth and with the reaction rotor external face gear teeth; and control means for selectively adjusting the rate of rotation of the reaction control rotor relative to the input member;

whereby relative rotation between the reaction control rotor and the input member results in both rotation and nutation of the conjugate motion converter about the input axis and thereby results in a continuously variable change of ratio of the rotational speed of the output member relative to the input member.

2. The continuously variable speed power transmission of claim 1, wherein said transmission is in a vehicle wheel hub.

3. The continuously variable speed power transmission of claim 1, wherein said transmission further comprises DC speed control motor elements integrated with said input member.

4. The continuously variable speed power transmission of claim 3, wherein said transmission is in a vehicle wheel hub.

5. A continuously variable speed power transmission with integrated motors/generator components comprising:

an input member rotatable about an input axis;

an output member rotatable about an output axis including a plurality of rearwardly directed output face cams thereon;

a reaction control rotor with integrated motor/generator components mounted for selective rotation about the input axis including a plurality of forwardly directed reaction face cams thereon in opposition to the output face cams on the output member;

a pericyclic motion converter rotatably mounted for nutational motion about the input axis including a plurality of load transmitting follower members thereon simultaneously engageable with the output face cams and with the reaction face cams; and control means for selectively adjusting the rate of rotation of the reaction control rotor relative to the input member;

whereby relative rotation between the reaction control rotor and the input member results in both rotation and nutation of the pericyclic motion converter about the input axis and thereby results in a continuously variable change of ratio of the rotational speed of the output member relative to the input member.

6. The continuously variable speed power transmission of claim 5, wherein said transmission is in a vehicle wheel hub.

7. The continuously variable speed power transmission of claim 5, wherein said transmission further comprises DC speed control motor elements integrated with said input member.

8. The continuously variable speed power transmission of claim 7, wherein said transmission is in a vehicle wheel hub.

9. A continuously variable speed power transmission comprising:

an input member rotatable about an input axis;

an output member rotatable about an output axis including a plurality of rearwardly directed output rotor external bevel gear teeth thereon;

a conjugate reaction control rotor with integrated motor/generator components mounted for selective rotation about the input axis including a plurality of forwardly directed reaction external bevel gear teeth thereon in opposition to the output external bevel gear teeth on the output member;

a conjugate motion converter with internal bevel gear teeth having pitch angles greater than 90 degrees embodied on both sides thereof and rotatably mounted for nutational and rotational motion about the input axis that are simultaneously engageable with the output rotor external bevel gear teeth and with the reaction rotor external bevel gear teeth; and control means for selectively adjusting the rate of rotation of the reaction control rotor relative to the input member;

whereby relative rotation between the reaction control rotor and the input member results in both rotation and nutation of the conjugate motion converter about the input axis and thereby results in a continuously variable change of ratio of the rotational speed of the output member relative to the input member.

10. The continuously variable speed power transmission of claim 9, wherein said transmission is in a vehicle wheel hub.

11. The continuously variable speed power transmission of claim 9, wherein said transmission further comprises DC speed control motor elements integrated with said input member.

12. The continuously variable speed power transmission of claim 11, wherein said transmission is in a vehicle wheel hub.

* * * * *